June 30, 1970     R. REDER ET AL     3,517,456
JET ENGINE SOUND SIMULATING DEVICE
Filed July 26, 1968     3 Sheets-Sheet 2
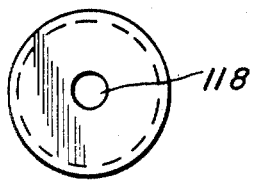
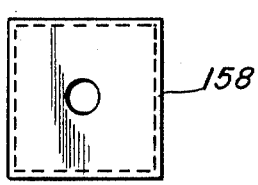
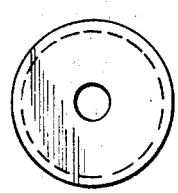
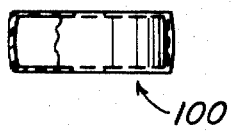
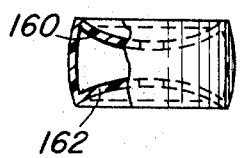
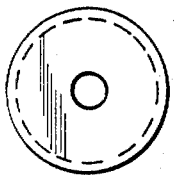
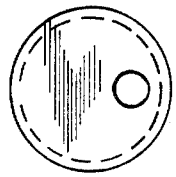
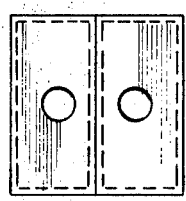
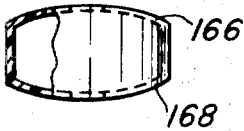
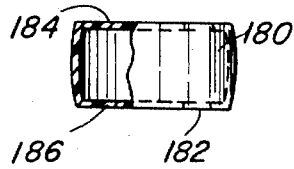
INVENTORS.
ROBERT REDER
JACK R. BEHRENDS
BY Kegan, Kegan & Berkman
ATTYS.

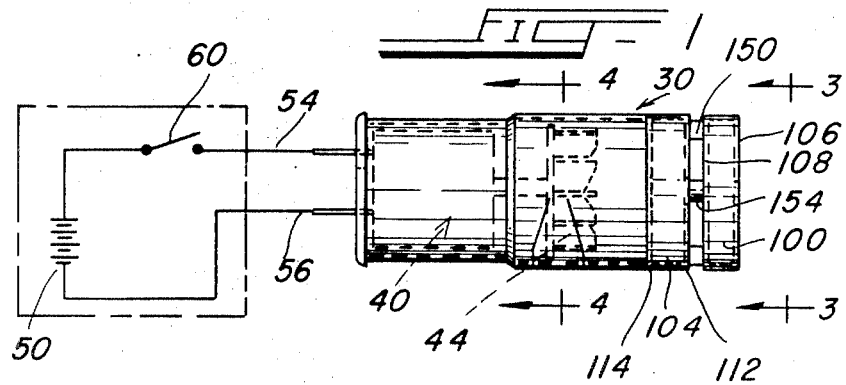
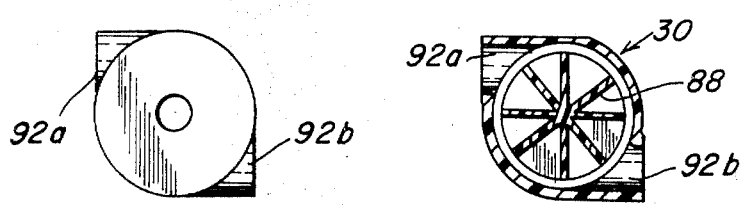
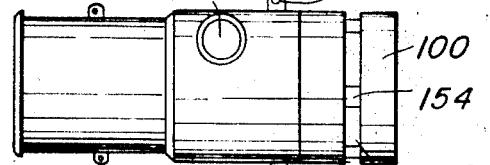
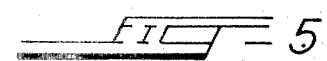
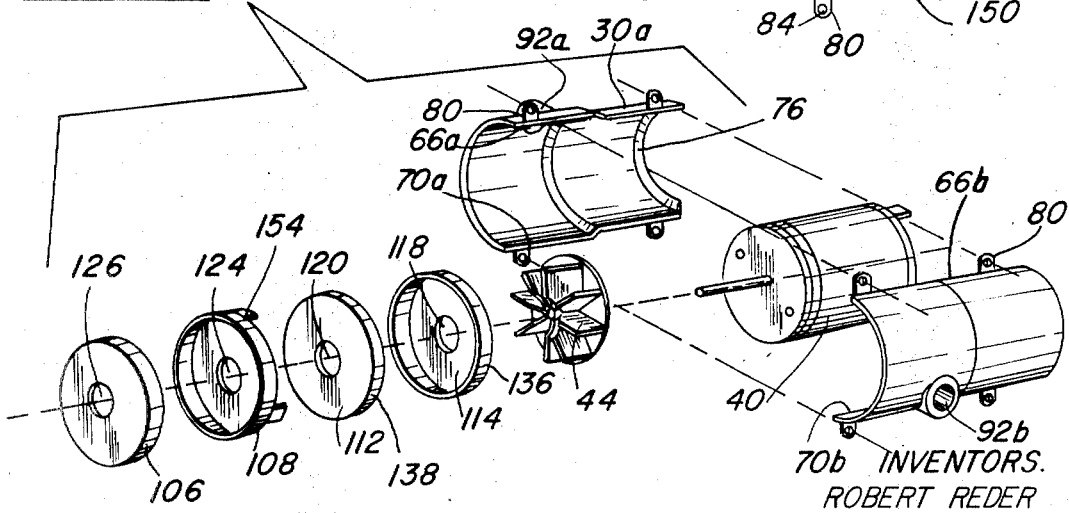

United States Patent Office 3,517,456
Patented June 30, 1970

3,517,456
JET ENGINE SOUND SIMULATING DEVICE
Robert Reder, Northfield, and Jack Richard Behrends, Prospect Heights, Ill., assignors to Monogram Models, Inc., Morton Grove, Ill., a corporation of Illinois
Filed July 26, 1968, Ser. No. 748,078
Int. Cl. A63h *33/26*
U.S. Cl. 46—232  12 Claims

ABSTRACT OF THE DISCLOSURE

A battery-powered, motor-driven fan assembly for toy planes and the like and functioning in cooperation with a plurality of resonant cavities to effect air passage therethrough to produce as an output a blend of audible tones constituting a sound pattern simulating the whine of a jet engine or turbine engine.

---

This invention relates to a noise generating device simulating the sound or whine of a jet engine. More particularly, the invention is directed to a jet engine sound simulating assembly adapted for incorporation in toy cars, planes or other vehicles, or model planes and models of the type whose real-life counter part is powered by jet or turbine engines. In the specific preferred embodiment of the invention described and illustrated, a battery-energized, motor-driven air impeller causes air to pass through a plurality of passages or chambers to produce multi-tones which blend audibly to provide the desired jet engine sound.

Many types of devices have been proposed and devised for simulating specific sounds generated by motors, generators, steam powered mechanisms, and air planes. These prior art structures have taken varied physical forms and structural arrangements, and many different manufacturing materials, fabrication techniques, and installation procedures have been used. Nevertheless, no completely satisfactory jet engine sound simulating device has heretofore been produced, each of the previously manufactured mechanisms having one or more undesirable or objectionable features deterring their acceptance and use. Some of the prior art noise generating mechanisms have been physically too large for convenient incorporation into the toy models. Others have required costly and cumbersome power supplies or drives. Still others have failed to provide "authenic" or realistic sound patterns or audible spectra. It is, therefore, the aim of the present invention to provide a jet engine noise simulating device which obviates the shortcomings of the prior art mechanisms and which functions effectively in a toy plane or other toy model to produce a remarkably convincing audible sound highly suggestive of the distinctive whine of a jet engine.

It is a principal object of the invention to provide a simple and reliable battery-driven noise generating mechanism which realistically simulates the whine characteristic of a jet engine.

It is a related important object of the invention to provide a device which produces a plurality of modes of oscillation yielding tones which blend with one another to provide an audible spectrum characteristic of that produced through operation of a jet engine.

Another object of the invention is to provide an inexpensive device of improved and simplified compact construction which may be mounted within the body of a toy plane or other vehicle and which functions to simulate faithfully the sound of a jet engine operating as a functional component element of the plane.

Still another object of the invention is to provide a noise generating device of the type described which can be economically manufactured and which is reliable and durable in use.

Still another object of the invention is to provide a multi-tone sound generating device energized through a single motor-driven air impeller and operative to cause air to pass through a plurality of cooperating sound-producing cavities.

Still another object of the invention is to provide a device of the type described and which is simple in form and adapted to economical manufacturing techniques.

Other objects, advantages, and features of this invention will become apparent from the following description considered in conjunction with the accompanying drawings, in which:

FIG. 1 is a side elevational view of the complete assembly of the jet sound simulating device of the invention;

FIG. 2 is a side elevational view of the multiple-chamber assembly of one preferred embodiment of the invention and showing an air discharge port;

FIG. 3 is an end view taken on the line 3—3 of FIG. 1;

FIG. 4 is a cross-sectional view taken on the line 4—4 of FIG. 1 and showing details of a fan blade or air turbine used in a preferred embodiment of the invention;

FIG. 5 is an exploded view showing the various structural components of the assembly of FIG. 1;

FIGS. 6 through 11 are top plan views of sound producing chambers of various shapes, each finding utility in the multi-cavity sound producing device of the invention;

FIGS. 6A through 11A are elevational views, with parts cut away, and showing details of the structures of the chambers of FIGS. 6 through 11, respectively;

Figure 12:
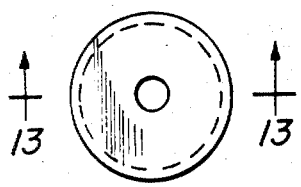
FIG. 12 is a top plan view of a cylindrical assembly of chambers of the sound producing device of the invention.

The battery-powered operating mechanism of a preferred form of the present invention is specifically engineered to provide an overall physical configuration adapted for incorporation within the body or fuselage of the toy jet plane or other vehicle. The size, style, shape and general features of the vehicle itself are of no patentable significance and, accordingly, no description or illustration is provided herein. It will be appreciated that the invention is generally useful in all types of jet planes and finds utility in other models of mechanical structures utilizing jet or turbine engines.

The aims and objects of the invention are accomplished by providing, for incorporation within the body of a toy jet plane, a generally tubular or cylindrical turbine-type fan assembly having air inlet and exhaust port means and disposed so that air forcibly passes through a plurality of spaced chambers or resonant cavities to provide audible multi-tones blending to produce a sound simulating the whine of a jet or turbine engine.

Referring now to the drawings, and particularly to FIGS. 1 through 5, for purposes of disclosure, the jet engine sound simulating device of the invention is shown as including a shell, housing, or casing 30, an electrically-powered motor 40, and a motor-driven fan blade or impeller 44. A battery or dry cell 50 or other power source connected to the motor 40 through suitable leads 54 and 56, and a control switch 60 provide the motor energizing power.

The general structure of the jet engine noise simulating device and the spacial arrangement and relative disposition of the various component parts of the assembly are indicated schematically in the exploded view of FIG. 5. In the illustrative embodiment of the device shown, the motor and impeller housing 30 is fabricated in two parts 30a and 30b of generally trough-like configuration and adapted for interconnection or bonding along abutting edge portions 66a and 66b and 70a and 70b, interconnection being conveniently effected through the use of an adhesive or a fusion technique. The forward end of the casing 30 is open and the rearward edge is formed with an integral radially inwardly extending partial wall or flange 76 which constitutes an abutment and retaining wall of the enveloped motor 40. Also integrally formed with the casing 30 and extending generally radially outwardly thereof are tabs 80, each having an opening or eyelet 84 to facilitate attachment or spacial suspension, preferably a resilient suspension, of the casing or housing within the body or fuselage of the toy jet plane or toy vehicle.

At a position opposed to and in substantial axial alignment or correspondence with the air impeller blades 88 of the fan 44, the casing 30 of the assembly is formed with air exhaust ports 92a and 92b opening radially of the casing. In the embodiment of the device illustrated a pair of ports are used, these being diametrically opposed and extending generally tangentially of the outer wall surface of the casing 30, as shown in FIGS. 3 and 4.

Fastened to the casing 30 and extending axially outwardly of the end 94 of the impeller 44 are a pair of in-line, hollow, wheel-like sectors or resonant chambers 100 and 104, each chamber including axially spaced end walls 106 and 108 and 112 and 114 provided with through ports 118 and 120 and 124 and 126 constituting air passage means for air intake during operation of the motor-driven fan blade or impeller 44. Encircling band-like sidewalls or rims 136 and 138 and 142 and 144 integrally formed with and extending transversely of corresponding end walls complete the chambers or resonant cavities 100 and 104. If preferred, the side walls may be of a one piece construction for each cavity. In the preferred embodiment of the assembly illustrated the two resonance chambers 100 and 104 are physically separated or spaced axially to define an air space 150 therebetween securement and retention of the chambers in their relative positions being effected through the use of interconnecting spacers, tabs, or lugs 154. The physical arrangement described ensures that the volume of air drawn through the second chamber 104 is not controlled entirely by and not necessarily equal to the volume of air drawn through the first chamber 100. In addition, the physical "separation" of the chambers enhances the resonance characteristics of each, facilitating independent modes of oscillation in response to air passage through the chamber.

In the specific illustrative form of the invention shown, the electric motor 40 is driven by a six-volt dry cell. It is obvious that any suitable combination of cells may be utilized to provide the necessary power. The tubular housing or casing 30 is preferably fabricated of plastic, polystyrene, polyvinyls, and polyesters being suitable materials. The fan blade or impeller is formed with 8 radially extending blades and the electric motor 40 drives the impeller at high speed (e.g. 10,000 r.p.m.) drawing air into the resonance cavities or chambers 100 and 104 through the ports 118 and 124 to create a high pitch whistling sound simulating that of a jet engine. An important feature of the device is the provision of multiple resonance chambers defined by bounding walls or diaphragms 106, 108, 112 and 114. Another important feature of the preferred embodiment of the invention is the provision of spacing 150 between the resonant cavities themselves. The air drawn through the cavities is discharged from the exhaust ports 92a and 92b in the blower housing 30.

From the foregoing description, those skilled in the relevant art will appreciate that the jet sound producing device of the invention may take many physical forms, all utilizing the inventive features and concepts upon which the subject development is predicated. For example, the resonance chambers may have planar sides 158 and may be rectangular in cross-section as shown in FIGS. 7 and 7a (rather than circular in cross-section (FIGS. 6 and 6a), which is the preferred embodiment). In addition, the chambers may be bounded by opposed end walls, 160 and 162 which are concave (FIGS. 8 and 8a) or convex 166 and 168 (FIGS. 9 and 9a), both of these structures providing good sound spectra and good volume. As still another variation, the air passage ports 180 and 182 formed in the end walls, 184 and 186 of the resonance chamber may be off center (FIGS. 10 and 10a) rather than centered (FIGS. 6 and 6a).

In the embodiment of the invention illustrated in FIGS. 11 and 11a, the resonance chambers are disposed laterally of one another rather than in line.

Figure 13:
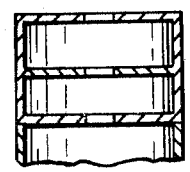
FIGS. 13 through 17 are partial vertical cross-sectional views showing various arrangements and spacing of diaphragms or partition walls separating coaxially disposed sound-producing cavities.
Figure 14:
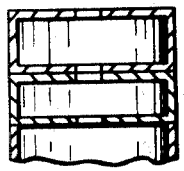
Figure 15:
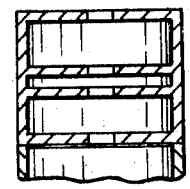
Figure 16:
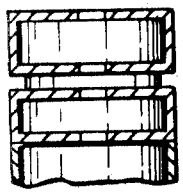

While in the preferred embodiment of the invention illustrated the two resonance chambers or cavities are separated by an air gap 150, and, although such a structure is preferred, adjacent chambers may be separated through only a common wall as shown in FIG. 13. Alternatively, the chambers may be separated by two contiguous walls as indicated in FIG. 14. FIG. 15 represents an arrangement in which the two chambers are separated by an air gap, the outer walls of the chambers being continuous and completely enclosing the air gap, thus forming an intermediate chamber.

Figure 17:
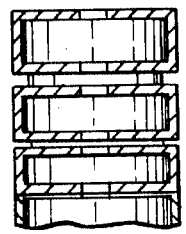

It will be appreciated from the foregoing discrption and discussion that the jet engine sound simulating device of the invention includes a minimum of two resonant chambers. It is possible, however, to include one or more additional chambers, one such an arrangement being illustrated schematically in the cross-section view constituting FIG. 17 in which three in-line and specially separated chambers are utilized.

While the foregoing detailed information is clearly sufficiently complete to enable those skilled in the art to practice the subject invention, the following additional detailed data are provided as exemplary of the preferred embodiment of the jet engine sound simulating device. Referring more particularly to FIGS. 1 and 5, the wall thickness of the resonant chambers or cavities 100 and 104 is approximately 0.04 inch, the axial depth of cavity 100 is 9/32" and of cavity 104 12/32", the spacing 150 between the cavities (FIG. 1) being 3/32". The port size for the first cavity 100 is 0.265" for the outer port and 0.25" for the inner port. In the second cavity 104 the first port has a diameter of 0.281" and the second port 0.265". The diameter of each cavity is 1⅛ inches. The air exhaust ports 92a and 92b are ⅜ in diameter and the turbine blade has a diameter of one inch and is ⅜" in height.

It will be appreciated that the major or gross dimensions may be dictated at least in part by the intended ultimate use of the assembly and that larger and smaller counterparts of the present invention may be fabricated without departing from the teachings thereof. Changes in wall thickness and in port sizes may also be made, these changes having some effect on the frequency or pitch outputs of the resonant cavities.

While disclosures of preferred embodiments of the invention and preferred methods of fabricating the structural components of the invention have been provided, it will be apparent to those skilled in the art that numerous modifications, changes and variations can be made without departing from the essential spirit and the underlined principles of the invention. It is, therefore, desired by the following claims to include within the scope of the invention all such variations and modifications by which substantially the results of this invention may be obtained through the use of substantially the same or equivalent means.

What is claimed is:

1. A mechanism for simulating the whine characteristic of jet and turbine engines, said mechanism comprising;
a housing containing an air impeller assembly, sound producing chamber means in fluid flow communication with said housing,
wall means dividing said chamber means into a plurality of resonant cavities,
said wall means having formed therein porting means in fluid communication with said cavities for introduction of air into and discharge of air therefrom, motor means, and air impeller means coupled to said motor means and rotatably driven thereby to effect passage of air through said cavities to produce thereby multi-tones blending audibly to simulate sounds of a jet engine.

2. The mechanism as set forth in claim 1 and further comprising electrically powered battery means driving said motor means.

3. The mechanism as set forth in claim 1 wherein said resonant cavities are in series air flow communication.

4. The mechanism as set forth in claim 1 wherein said housing is an elongated tube, and wherein said wall means comprise a plurality of diaphragm-like plates spaced axially of said tube and extending generally transversely of a longitudinal axis thereof, said plates constituting partitions defining an array of in-line coaxially disposed resonance cavities, each said chambers communicating with chambers there adjacent through air flow ports formed in said plates.

5. The mechanism as set forth in claim 4 wherein said air impeller means consists essentially of a turbine-like assembly in axial alignment with said housing and oriented to rotate in a plane paralleling said plates, said turbine-like assembly comprising a disc and air impeller vanes carried by said disc and extending transversely thereof.

6. The structure as set forth in claim 4 wherein said air flow ports formed in said plates are substantially in axial alignment.

7. The mechanism as set forth in claim 1 and further comprising means spacing adjacent chambers axially from each other to provide an air-gap between facing walls of two said adjacent chambers.

8. The mechanism as set forth in claim 7 wherein said means spacing said chambers constitute tabs extending between and separating said facing walls of said chambers.

9. The mechanism as set forth in claim 4 wherein said plates are of a substantially planar configuration.

10. The mechanism as set forth in claim 4 wherein said plates are generally dish-shaped.

11. The mechanism as set forth in claim 1 wherein said housing has formed in a bounding wall thereof an aperture in fluid communication with said cavities and constituting a port for discharge of air entering and passing through said cavities.

12. The mechanism as set forth in claim 1 wherein said housing has formed in a bounding wall thereof a pair of diametrically opposed apertures in a region substantially in axial correspondence with said air impeller means, said apertures being in fluid communication with said cavities and constituting ports for discharge of air entering and passing through said cavities.

References Cited

UNITED STATES PATENTS 2,917,866  12/1959  Ullmann _____ 46—111 X
3,391,489   7/1968  Lohr et al. _____ 46—232

ROBERT PESHOCK, Primary Examiner

R. F. CUTTING, Assistant Examiner

U.S. Cl. X.R.

46—178, 179.